Dec. 13, 1955 W. F. ALLER 2,726,539
AIR GAUGING DEVICE FOR SIZE MEASUREMENT
Filed May 1, 1951 4 Sheets-Sheet 1

INVENTOR.
W. F. Aller
BY Edward J. Noif
atty.

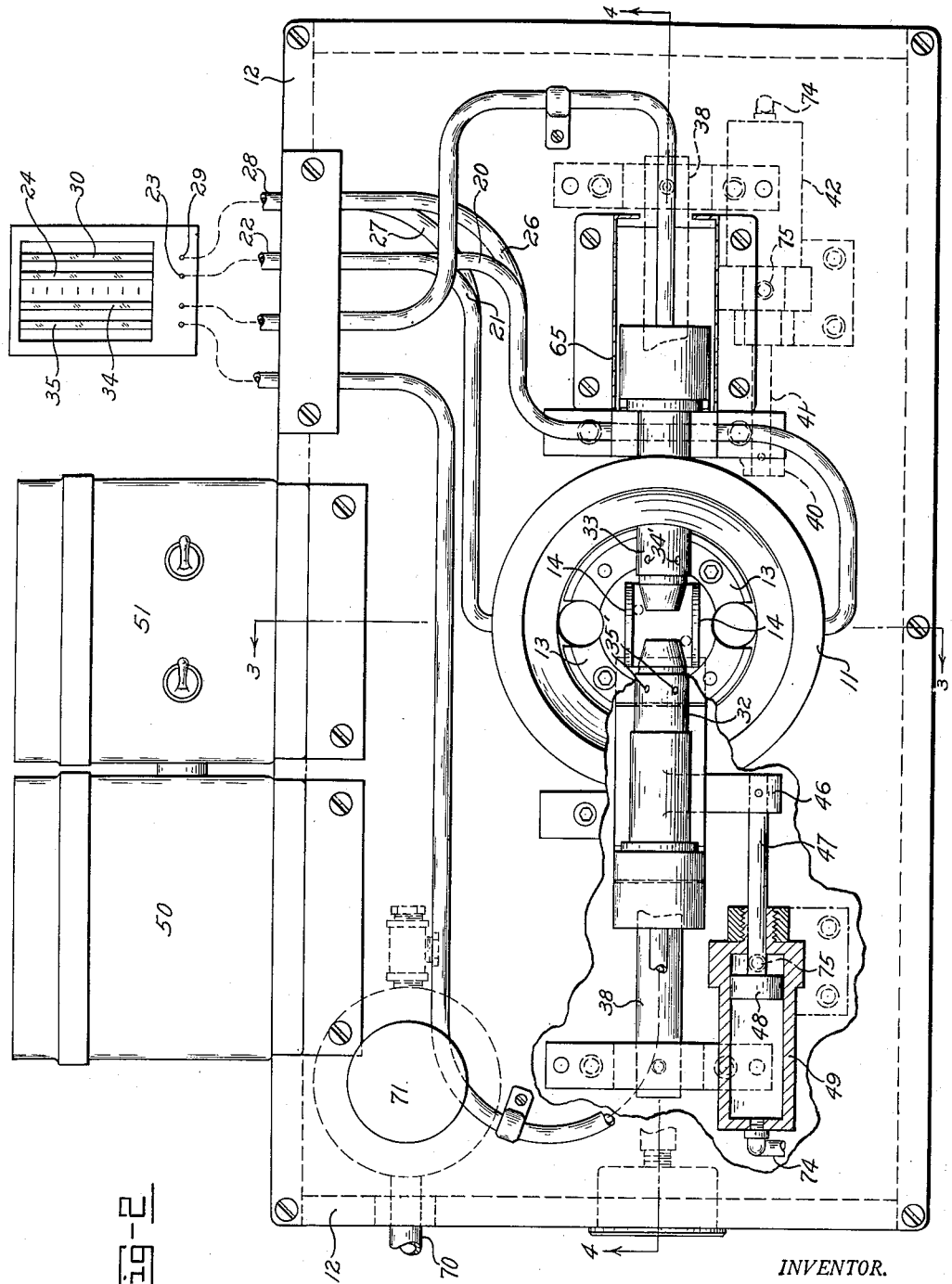

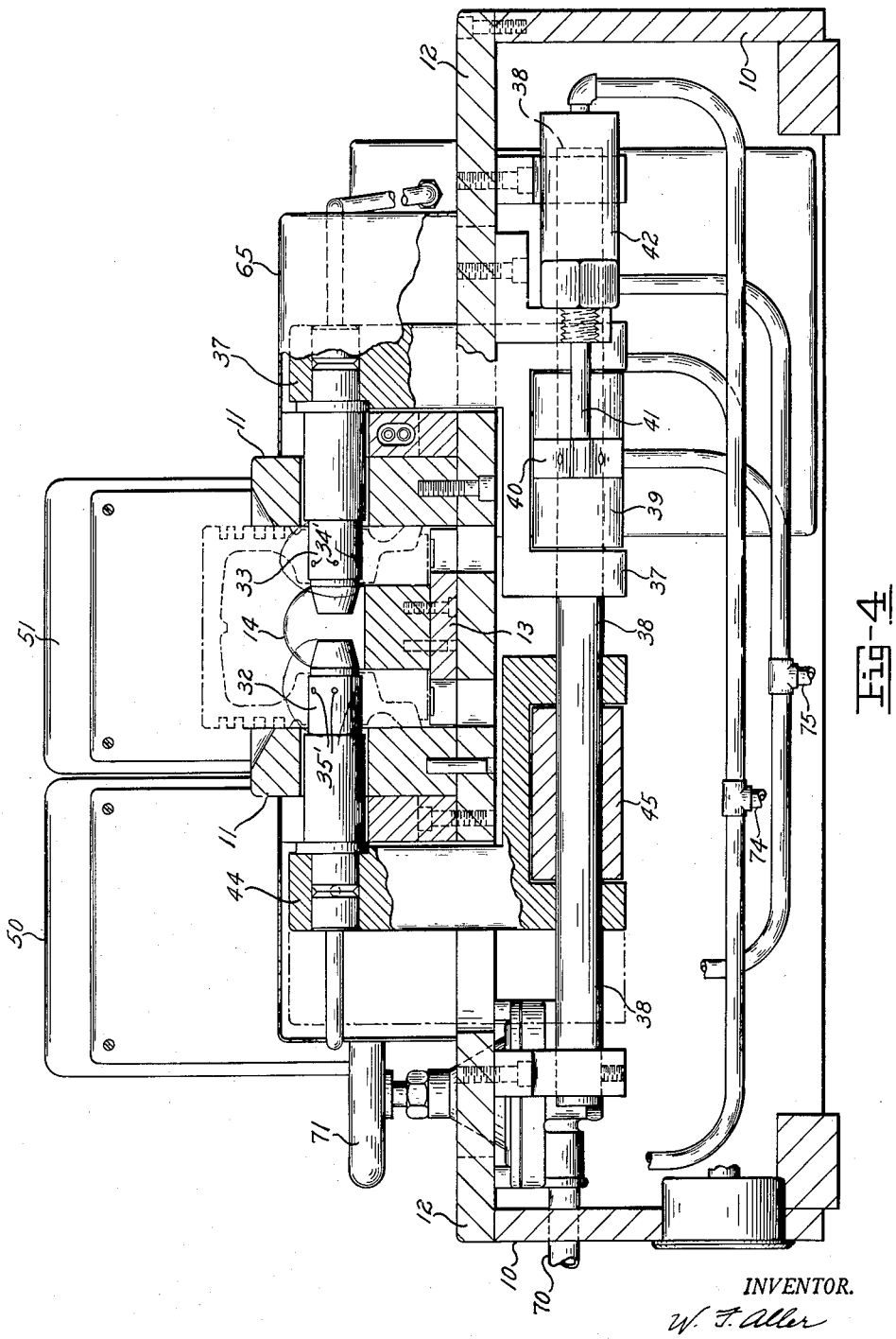

Dec. 13, 1955 W. F. ALLER 2,726,539
AIR GAUGING DEVICE FOR SIZE MEASUREMENT
Filed May 1, 1951 4 Sheets-Sheet 4

INVENTOR.
W. F. Aller
BY Edward T. Noig
atty.

United States Patent Office 2,726,539
Patented Dec. 13, 1955

2,726,539

AIR GAUGING DEVICE FOR SIZE MEASUREMENT

Willis Fay Aller, Dayton, Ohio, assignor to The Sheffield Corporation, Dayton, Ohio, a corporation of Ohio Application May 1, 1951, Serial No. 223,965

7 Claims. (Cl. 73—37.9)

This invention relates to gauging apparatus for checking dimensions of an object and is particularly adapted for checking diameters of objects of generally cylindrical form having a transverse passage such as a piston for example.

One object of the invention is the provision of a gauging apparatus of the character mentioned in which a stationary article receiver is provided with side walls for the reception of the object and with locating means to arrange the object in proper gauging position against rotational movement and in which a pair of opposed plungers having air gauging nozzles are operable into and out of the receiver, the indication of the measurement checked being determined by indicating means connected to the gauging nozzles.

Another object is the provision of a gauging apparatus as mentioned above in which additional gauging nozzles are provided in the side walls for cooperative association with an outside diameter or different diameters of the object.

Another object is the provision of gauging apparatus having two opposed plungers cyclically operable into and out of gauging position with predetermined time delays in the extended and retracted positions of the plungers, the moving means for such plungers including fluid pressure cylinders under the control of timing means.

Another object is the provision of a piston gauge having means for indicating outer diametrical measurements of the piston and for independently checking the piston pin hole diameters by means of continuously operable gauging plungers movable into and out of the piston pin holes and provided with gauging nozzles connected to an indicating means.

Other objects and advantages of the invention will be apparent from the following description, the appended claims and the accompanying drawing, in which Fig. 1 is a perspective view of a gauging apparatus embodying the present invention;

Fig. 2 is a top plan view of the gauging apparatus;

Fig. 4 is a longitudinal sectional view of the line 4—4 of Fig. 2;

Figure 1:
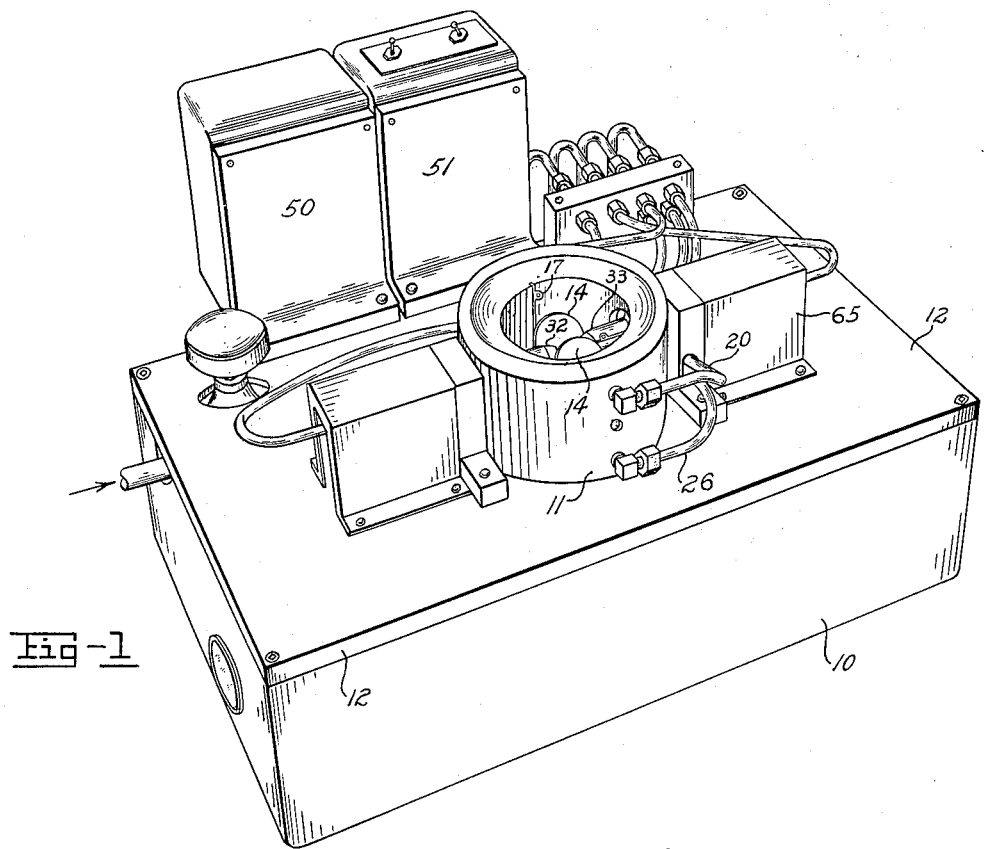
Figure 3:
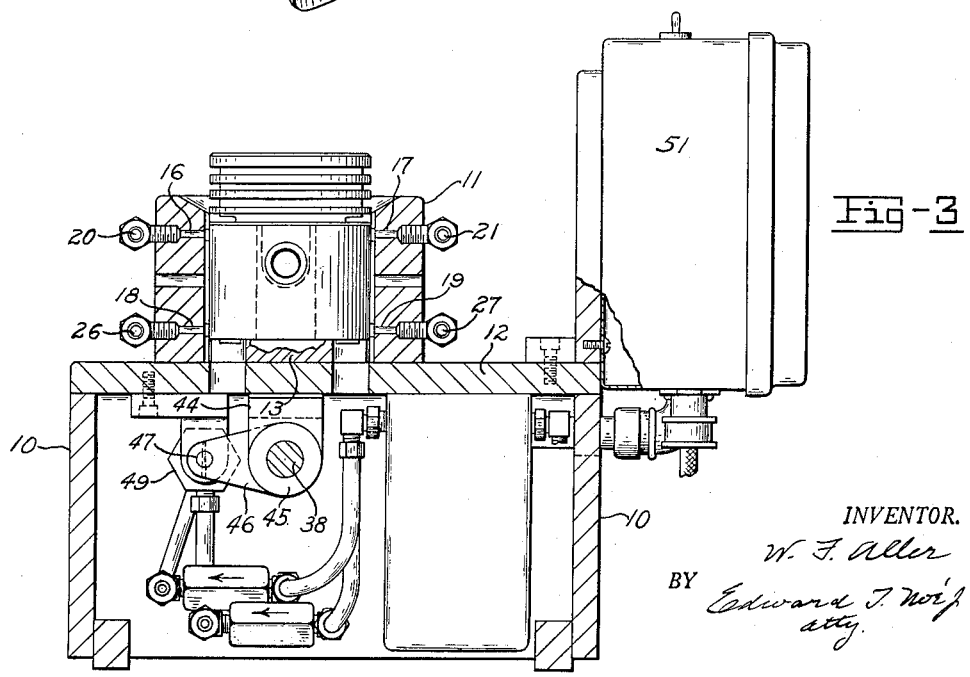
Fig. 3 is a vertical sectional view of the line 3—3 of Fig. 2.

Referring more particularly to the drawing in which the same parts are designated by corresponding reference numerals in the several views, the embodiment of the invention herein shown is adapted for gauging outer diameters and hole diameters of an object. For purpose of exemplification, the object takes the form of a piston of generally cylindrical form having piston pin holes extending in the customary manner transversely of the piston axis.

The gauge base 10 is provided with a stationary article receiver constituted of annular side walls 11 open to the top and fixed to the upper plate 12 of the base. The inner diameter of the chamber thus formed is slightly in excess of the maximum diameter of the articles to be gauged so that these articles can be supplied manually from above merely by dropping them into the receiving chamber, and after the gauging operation has taken place, a gauged article may be manually picked out of the chamber and a new one substituted. As herein provided, the gauging operation takes place under the control of adjustable timing means which gives the operator sufficient time to note the indications obtained during actual gauging and sufficient time to remove a gauged article and substitute another one before the gauging cycle starts again. As will be described, gauging means are provided in the side walls of the receiver so that a diametrical measurement is obtained near the upper portion and another measurement obtained near the lower portion of the piston, and additional gauging means are provided in a pair of opposed plungers that move into and out of the piston pin holes, enabling the independent gauging of the piston hole chambers.

The upper plate 12 of the base carries a locating block 13 having a pair of upwardly extending wings 14 which loosely engage the inwardly facing opposed flat surfaces of the inside of the piston and serve to roughly locate the piston against rotational movement, and in approximate gauging position. The exact gauging position is determined by the plungers themselves that engage the piston pin holes and the tapered ends of these plungers is such that they will be sure of entering the piston pin holes when the piston is approximately located by the locating wings 14.

Arranged in the side walls 11 of the receiver there is a pair of opposed air nozzles 16 and 17 for checking the outside diameter of the piston near its upper portion, while another pair of air nozzles 18 and 19 are arranged for cooperation with the lower portion of the piston. Air leakage from these nozzles depends on the clearance between the ends of the nozzles and the adjacent portions of the piston so that the flow through the nozzles is dependent on the piston size. The two upper nozzles 16 and 17 are connected through conduits 20 and 21 to a common passage 22 leading to an air gauge indicator of any suitable form, for example an air gauge of the general character of Aller Patent 2,254,259, granted September 2, 1941. As shown the passage 22 leads to a connection 23 which is connected to the upper end of a tapered indicating tube 24 containing a float that determines the rate of flow of air supplied under pressure and passing upwardly through the tube and out through the connection 23. In a similar manner nozzles 18 and 19 are connected through conduits 26 and 27 to a common passage 28 leading to a connection 29 which is connected to the upper end of an indicating tube 30. The float levels in the two indicating tubes 24 and 30 thus show the diameters respectively at the upper and lower portions of the piston. By comparing the relation of these two indications the amount of taper of the piston can also be observed.

The two plungers that engage the piston pin holes are designated 32 and 33 respectively and are similarly mounted for simultaneous movement towards and away from one another. Normally they are retracted so that the ends of the plungers are contained within the walls of the receiver but when extended, as indicated in Figs. 2 and 4, they enter the piston pin holes and gauge the size of these holes by means of leakage nozzles 34' and 35' connected independently through conduits to indicating tubes 34 and 35. The indication shown on tube 34 thus shows the size of the right hand piston pin hole as viewed in Figs. 2 and 4, while the size of the other piston pin hole is shown on tube 35.

The plunger 33, for example, is fixed to an L shaped carrying bracket 37 projecting up through a slot in the upper plate 12 of the base. The lower end of this bracket is slidably carried on a fixed carrying bar 38. The lower portion of the bracket 37 is recessed to receive an operating member 39 also slidably received on the bar 38. The upper portion of the bracket 37 is covered and protected by a suitable cover plate 65 fixed to the upper wall 12 of the base. The operating member 39 has a laterally projecting arm 40 connected to a piston rod 41. This piston rod is fixed to a piston operable in an air cylinder 42. When air is supplied to the right hand end of cylinder 42, the piston rod is forced to the left carrying with it the arm 40 and operating member 39 so as to move the bracket 37 and plunger 33 into position shown in full lines in Figs. 2 and 4. When air is supplied to the left side of this cylinder the piston rod is forced back carrying all the parts with it to a normal retracted position.

In a similar manner the plunger 32 is carried by a bracket 44 controlled by an operating member 45 having arm 46 connected to piston rod 47, operated by piston 48 in the cylinder 49.

Air is automatically supplied to the outer ends of both of the air cylinders 42 and 49 to move the plungers into gauging position. In the timed cycle of operations the plungers remain stationary in their projected position for a certain predetermined time so that the operator can observe the indications obtained and then they are automatically retracted and remain in their retracted position a predetermined time so that the operator can replace a gauged article with another one.

Figures 5, 6:
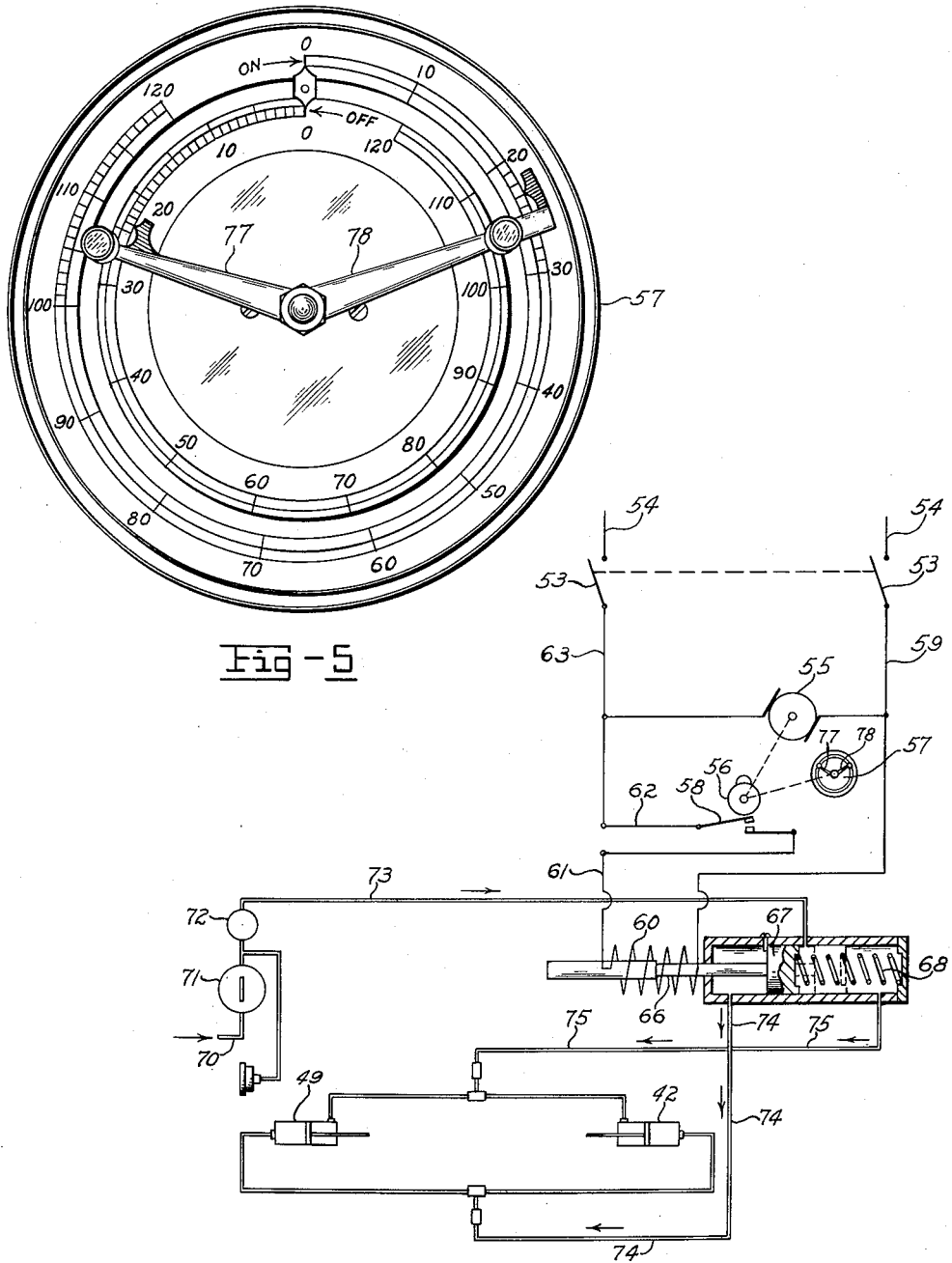
Fig. 5 is a view of the cycle timing control.
Fig. 6 is a diagrammatic view showing the electrical and air connections employed.

Fastened to the back portion of the base are casings 50 and 51 containing the supply and control system for air and electric current. Referring more particularly to Figs. 5 and 6 by closing the energizing switch 53 current is supplied from a power source 54 to a timing motor 55 which controls cam timing mechanism generally designated 56, adjustable by timing control adjustment 57. The timing cams control an automatic switch 58. When the timer switch is closed current is supplied from lead line 59 through a solenoid 60, lead line 61, switch 58, lead line 62, to supply side 63 so as to move a valve rod 66 and piston 67 towards the right against the action of spring 68. This permits air to flow from a supply pipe 70 through pressure regulator 71, air cleaner 72 and pipe 73 to an air supply pipe 74 and thus to the outer ends of the two cylinders 49 and 42. This causes both plungers to move into gauging position and they will remain there until the air control valve piston 67 is again operated. This occurs when the switch 58 is deenergized in the cycle causing the deenergization of solenoid 60 so the spring 68 causes piston 67 to move to the position shown in Fig. 6. Air thus flows from pipe 73 to the supply pipe 75 leading to the inner ends of the two operating cylinders and causes the plungers to move outwardly into their retracted positions.

The control 57 determines the amount of time the plungers remain in gauging position and the amount of time they remain in retracted position and both of these two time intervals are independently adjustable by independently controlling the positions of two adjustment levers 77 and 78. Any suitable form of control device may be employed for this purpose and since this invention is not concerned with the particular form of control that is employed, the details of its construction are not here presented. Suffice it to say that the motor 55 continues operating so long as the main control switch 53 is energized and cams are provided under the control of that motor so as to close switch 58, keeping the switch closed a predetermined time which can be adjusted, then open the switch 58 and keep it open for a predetermined time which can also be adjusted according to the requirements of the particular gauging operation.

It will now be apparent that applicant has provided a continuously operating gauging device having a predetermined timed cycle in which the gauging plungers repeatedly move into and out of gauging position with a sufficient time delay to provide the operator time to perform his operations without requiring him to start a new cycle of operation for each part to be gauged. The stationary receiver in which the articles are placed is so arranged that the articles to be gauged can be merely dropped into place and the article is then immediately ready to be gauged without requiring further shifting of the article into another gauging station. However, if the operator is not quite fast enough in applying a new article after removing the gauged article, or if the new article is not all the way applied, or is improperly located in the receiver, or if the piston holes are too small to permit the entrance of the gauging plungers, no damage will be done since the plungers are operated by air pressure. The air pressure is such that undue force would not be exerted on the plungers, the diameters of the pistons that control these plungers being comparatively small.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Gauging apparatus for checking dimensions of an object of generally cylindrical form having a transverse passage, said apparatus comprising a support having a stationary receiver provided with annular side walls and being open at its top and adapted to receive the object from above, said receiver having locating means to locate the object in proper gauging position against substantial rotational movement, a pair of opposed plungers operable transversely of the longitudinal axis of the side walls into the receiver for entrance into the passage in the object, means supporting said plungers for axial movement, means for continuously moving said plungers into and out of the object with predetermined timed delays in the extended and retracted positions of the plungers, and indicating means, there being air leakage gauging nozzles in said plungers for cooperative association with said passage and connected to said indicating means.

2. A piston gauging apparatus for checking dimensions of a piston of generally cylindrical form having a transverse piston pin hole, said apparatus comprising a support having a stationary receiver provided with annular side walls and being open at its top and adapted to receive the piston from above, said receiver having locating means to locate the piston in proper gauging position against substantial rotational movement, a pair of opposed plungers operable transversely of the longitudinal axis of the side walls into the receiver for entrance into the piston pin hole, means supporting said plungers for axial movement, means for continuously moving said plungers into and out of the piston with predetermined timed delays in the extended and retracted positions of the plungers, there being gauging nozzles in said side walls for cooperative association with an outer diameter of the piston, indicating means connected to the gauging nozzles in said side walls, there being air leakage nozzles in said plungers for cooperative association with said passage, and indicating means connected to the air leakage nozzles in said plungers.

3. Gauging apparatus for checking dimensions of an object of generally cylindrical form having a transverse passage, said apparatus comprising a support having a stationary receiver provided with annular side walls and being open at its top and adapted to receive the object from above, said receiver having locating means to locate the object in proper gauging position against substantial rotational movement, a pair of opposed plungers operable transversely of the receiver axis into the receiver for entrance into the passage in the object, means supporting said plungers for axial movement, means including an air pressure cylinder for each of said plungers for continuously moving said plungers into and out of the object with predetermined timed delays in the extended and retracted positions of the plungers, and indicating means, there being air leakage gauging nozzles in said plungers for cooperative association with said passage and connected to said indicating means.

4. Gauging apparatus for checking dimensions of an object of generally cylindrical form having a transverse passage, said apparatus comprising a support having a stationary receiver provided with side walls and being open at its top and adapted to receive the object from above, said receiver having locating means to locate the object in proper gauging position against substantial rotational movement, a pair of opposed plungers operable transversely of the receiver axis into the receiver for entrance into the passage in the object, means supporting said plungers for axial movement, means for continuously moving said plungers into and out of the object with predetermined timed delays in the extended and retracted positions of the plungers, and a plurality of indicators, there being an air leakage gauging nozzle in each of said plungers each connected to one of said indicators and each cooperatively associated with all said passages.

5. A piston gauging apparatus for checking dimensions of a piston of generally cylindrical form having a piston pin hole, said apparatus comprising a support having a stationary receiver provided with side walls and being open at its top and adapted to receive the piston from above, said receiver having locating means to locate the piston in proper gauging position against substantial rotational movement, a pair of opposed plungers operable transversely of the receiver axis into the receiver for entrance into the piston pin hole, means supporting said plungers for axial movement, means for continuously moving said plungers into and out of the piston with predetermined timed delays in the extended and retracted positions of the plungers, there being a plurality of opposed gauging nozzles in said side walls for cooperative association with an outer diameter of the piston, a plurality of indicating devices, there being air leakage nozzles in each of said plungers for cooperative association with said passage, means connecting the gauging nozzles in said side walls to one of said indicating devices, means connecting the gauging nozzles in one of said plungers to another of said indicating devices and means connecting the gauging nozzles in the other plunger to still another one of said indicating devices.

6. A piston gauging apparatus, said apparatus comprising a support having a stationary receiver provided with annular side walls and being open at its top and adapted to receive a piston from above, said receiver having locating means to locate the piston in a proper gauging position against substantial rotational movement, a pair of opposed plungers operable transversely of the receiver axis into the receiver for entrance into the piston pin hole, means supporting said plungers for axial movement, means operatively connected to said plungers for moving said plungers into and out of the piston in the extended and retracted positions of the plungers respectively, there being air leakage nozzles in each of said plungers for cooperative association with said piston pin hole, and means for connecting the air leakage nozzles in one of said plungers to an indicating device and means for connecting the air leakage nozzles in the other plunger to still another indicating device.

7. A piston gauging apparatus, said apparatus comprising a support having a stationary receiver provided with annular side walls and being open at its top and adapted to receive a piston from above, said receiver having locating means to locate the piston in proper gauging position and against substantial rotational movement, a gauging plunger operable transversely of the axis of the receiver and into the receiver for entrance into the piston pin hole, means supporting said plunger for axial movement, means for moving said plunger into and out of the piston in the extended and retracted positions of the plunger respectively, there being air leakage nozzles in said plunger for cooperative association with said piston pin hole, and means connected to said air leakage nozzles adapted for connection to a source of air under pressure and an indicating device.

References Cited in the file of this patent

UNITED STATES PATENTS

| | | |
|---|---|---|
| 2,419,280 | Neff | Apr. 22, 1947 |
| 2,431,014 | Aller | Nov. 18, 1947 |
| 2,465,002 | Aller | Mar. 22, 1949 |
| 2,490,376 | Rupley | Dec. 6, 1949 |
| 2,621,511 | Van Dorn | Dec. 16, 1952 |
| 2,647,456 | Aller et al. | Aug. 4, 1953 |
| 2,659,157 | Aller | Nov. 17, 1953 |

OTHER REFERENCES

Multiple Air Gauging Operations, W. F. Aller, American Machinist, Jan. 30, 1947, pp. 101–103.